United States Patent
Chen et al.

(10) Patent No.: US 8,230,125 B2
(45) Date of Patent: Jul. 24, 2012

(54) METHODS FOR RESERVING INDEX MEMORY SPACE IN AVI RECORDING APPARATUS

(75) Inventors: Min-Shu Chen, Taipei Hsien (TW); Ji-Shiun Li, Tainan County (TW); Shih-Rong Kao, Hsinchu (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 452 days.

(21) Appl. No.: 11/927,695

(22) Filed: Oct. 30, 2007

(65) Prior Publication Data

US 2009/0113148 A1    Apr. 30, 2009

(51) Int. Cl.
*G06F 12/04* (2006.01)

(52) U.S. Cl. .............................................. 710/9; 710/30

(58) Field of Classification Search .................... 710/52; 368/95
See application file for complete search history.

(56) References Cited

U.S. PATENT DOCUMENTS

| | | | |
|---|---|---|---|
| 5,802,064 A * | 9/1998 | Lieberman | 370/469 |
| 5,835,671 A * | 11/1998 | Kitamura et al. | 386/243 |
| 5,870,474 A * | 2/1999 | Wasilewski et al. | 380/211 |
| 6,285,825 B1 * | 9/2001 | Miwa et al. | 386/248 |
| 6,380,946 B1 * | 4/2002 | Galal | 345/620 |
| 6,434,625 B1 * | 8/2002 | Loen | 709/236 |
| 7,039,727 B2 * | 5/2006 | Camara et al. | 710/5 |
| 7,068,307 B2 * | 6/2006 | Hyodo | 348/220.1 |
| 7,076,605 B1 * | 7/2006 | Son | 711/113 |
| 7,152,197 B2 * | 12/2006 | Blacquiere et al. | 714/755 |
| 7,203,955 B2 * | 4/2007 | Mercier | 725/141 |
| 7,519,274 B2 * | 4/2009 | Li | 386/248 |
| 7,583,299 B2 | 9/2009 | Kuriyama | |
| 7,668,242 B2 * | 2/2010 | Sullivan et al. | 375/240.25 |
| 7,669,195 B1 * | 2/2010 | Qumei | 717/170 |
| 7,885,337 B2 * | 2/2011 | Lee et al. | 375/240.25 |
| 7,965,736 B2 * | 6/2011 | Ling | 370/465 |
| 2004/0052501 A1 * | 3/2004 | Tam | 386/46 |
| 2005/0123283 A1 | 6/2005 | Li | |
| 2005/0157599 A1 * | 7/2005 | Kiyama et al. | 369/30.03 |
| 2006/0256865 A1 * | 11/2006 | Westerman | 375/240.12 |
| 2006/0256868 A1 * | 11/2006 | Westerman | 375/240.24 |
| 2006/0268841 A1 * | 11/2006 | Nagaraj et al. | 370/352 |
| 2007/0030276 A1 * | 2/2007 | MacInnis et al. | 345/505 |
| 2008/0037958 A1 * | 2/2008 | Soroushian et al. | 386/125 |
| 2009/0103897 A1 * | 4/2009 | Chen et al. | 386/104 |
| 2010/0020970 A1 * | 1/2010 | Liu et al. | 380/255 |

* cited by examiner

*Primary Examiner* — Cheng-Yuan Tseng
(74) *Attorney, Agent, or Firm* — Winston Hsu; Scott Margo

(57) ABSTRACT

A method for reserving memory space for storing chunk sizes during Audio Video Interleave (AVI) recording, wherein an AVI file contains a plurality of interleaved audio-video (A/V) chunks, includes: recording the AVI file sizes to the second storage; when the second storage reaches capacity, moving at least a first A/V chunk size to the first storage; and after the recording has finished, reading stored A/V chunks from the first storage to the second storage to create an index chunk.

2 Claims, 2 Drawing Sheets

METHODS FOR RESERVING INDEX MEMORY SPACE IN AVI RECORDING APPARATUS

BACKGROUND

The present invention relates to AVI systems, and more particularly to systems and methods for reserving space in a memory required for storing the index of an AVI file.

The Audio Video Interleave (AVI) file format is based on a RIFF (Resource Interchange File Format) system, which can capture, edit, and playback audio-visual media. AVI divides data into blocks, or "chunks". In general, an AVI file consists of multiple streams of interleaved audio and video data, which is subdivided into two mandatory sections and one optional section. AVI files begin with a file header containing metadata about the video (e.g. width, height, frame rate), followed by the actual audio and video data. The optional section indexes the physical addresses of the data chunks.

The index chunk contains a list of data chunks and their location in the file, and therefore enables a user to access a particular section in the file without having to search through and parsing the whole file. Although the inclusion of the index chunk is optional, the omission of the index chunk makes the data unsearchable, and may render the entire AVI file unplayable in some systems. In order for the index chunk to determine an address for each data chunk, it must know the size of each interleaved audio or video (A/V) chunk. The byte size of all A/V chunks must be stored in the memory. As video data is encoded using Variable Bit Rate (VBR) encoding, each chunk address utilizes a plurality of bytes, thereby occupying significant space in the DRAM. For example, if the memory required for storing the chunk size of a frame is 20 bits, it takes 2160 Kbytes of DRAM resource for recording eight hours NTSC video (20 bits/frame*8 hours*60 minutes*60 seconds*30 frames=2160 Kbytes).

SUMMARY

It is therefore an objective of the present invention to provide a method of reserving space in a memory required for storing the index of an AVI file.

With this in mind, a method for aligning data of an Audio Video Interleave (AVI) file, the AVI file comprising audio data and a plurality of video chunks, is disclosed. The method comprises: calculating and inserting padding data on the plurality of the video chunks to ensure byte alignment; interleaving the audio data to the byte aligned video chunks; and storing a size of the video chunk with a reduced number of bytes. The audio data is interleaved to the plurality of video chunks at specific time intervals each corresponding to a plurality of video frames.

A method according to a second embodiment of the present invention is also disclosed. An AVI file comprises a plurality of interleaved audio-video (A/V) chunks. The method comprises: providing a first storage; providing a second storage; recording AVI chunk sizes to the second storage; when the second storage reaches capacity, moving at least a first A/V chunk size to the first storage; and after the recording has finished, reading stored A/V chunk sizes from the first storage to the second storage to create an index chunk. These and other objectives of the present invention will no doubt become obvious to those of ordinary skill in the art after reading the following detailed description of the preferred embodiment that is illustrated in the various figures and drawings.

DETAILED DESCRIPTION

The present invention aims to provide methods for minimizing the amount of storage space required for creating an index chunk of an AVI file. As is well known in the art, audio-video encoding methods do not need to encode each individual frame of audio-visual data. For example, if a section of video data is a 'still' scene (i.e. a plurality of identical frames) then only one frame (reference frame) needs to be encoded, and the other frames can be simply reconstructed by copying the corresponding reference frame. Furthermore, for interleaving purposes, extra video frames may be added. Therefore, each audio-visual chunk will differ in size.

The VBR nature of the video data means that a number of bytes need to be utilized for storing a video chunk address. Audio data, however, is recorded according to a Constant Bit Rate (CBR). In this case, only one byte per audio chunk needs to be utilized for the address. In order to reduce the amount of bytes required for storing the video chunk addresses, a first embodiment of the present invention aligns some bytes of all video data. For example, padding bytes are added to the video chunks to make each chunk size a multiple of 256. A $2^n$ byte alignment is utilized as an ideal for adding zeros to the plurality of frames in each video chunk to result in alignment of all video chunks. Please note that other alignments can also be utilized without departing from the spirit of the present invention, higher byte alignments require less bytes for chunk size representation, however, higher byte alignments have more 'zeros' and therefore have less bytes available to be utilized for chunk size representation.

Figure 1:
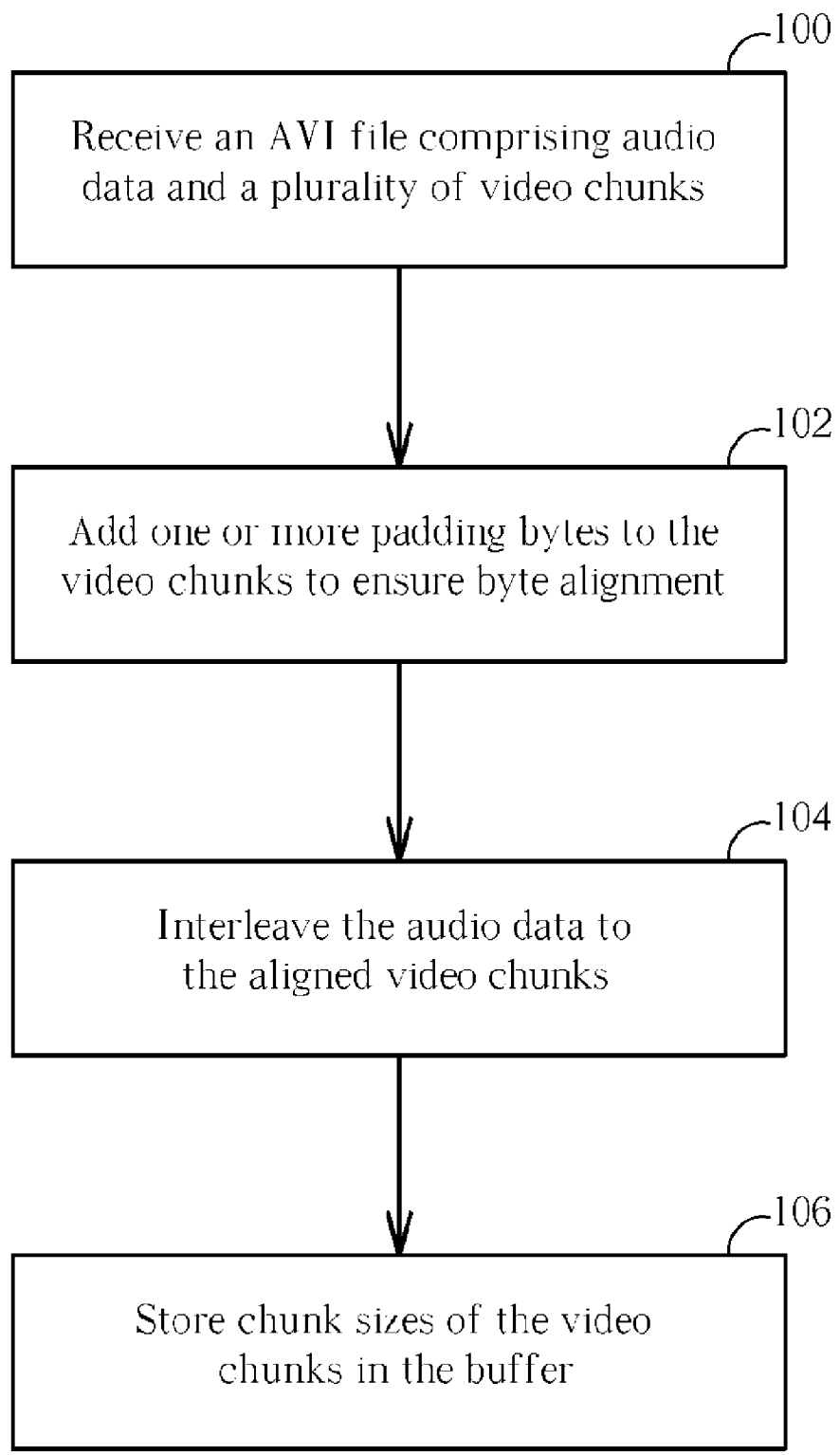
FIG. 1 is a flowchart of a method according to a first embodiment of the present invention.

Please refer to FIG. 1, which is a flowchart of the method according to a first embodiment of the present invention. The steps are as follows:

Step 100: Receive an AVI file comprising audio data and a plurality of video chunks;

Step 102: Add one or more padding bytes to the video chunks to ensure byte alignment;

Step 104: Interleave the audio data to the aligned video chunks;

Step 106: Store chunk sizes of the video chunks in the buffer.

As the audio data is already recorded utilizing a constant bit rate (CBR) it is difficult to perform zero padding on the audio data. However, after audio and video synchronization, the audio and video data are not interleaved with a constant rate, so the size of the audio chunk needs to be recorded. In order to save the buffer required for recording the audio chunk size, the first embodiment interleaves the audio and video data at certain points, for example, every 0.5 seconds of video data.

The disadvantage of the first embodiment is that a certain amount of disc space is wasted on the added padding bytes, so the overall length of stored data increases. Where available recording/playback space is a priority, this method is not ideal. Therefore, a second embodiment is also proposed.

In the second embodiment, a first storage and a second storage are both utilized for storing the AVI audio/video chunk size, where a data accessing speed of the second storage is greater than a data accessing speed of the first storage. In this embodiment, the second storage is a buffer located in the Dynamic Random Access Memory (DRAM), and the first storage is a random access storage such as a hard disk drive (HDD) or a Compact Flash (CF) card. During recording, the A/V chunk size is continuously recorded in the buffer. When allocated space in the buffer is almost full, some of the stored A/V chunk sizes will be moved to the random access storage, and then more data is recorded to the buffer. When recording is finished, the data stored in the random access storage can be read in order to create AVI index chunk to be recorded in the AVI file. In this way, the AVI index chunk can be created without taking up unnecessary storage space.

Figure 2:
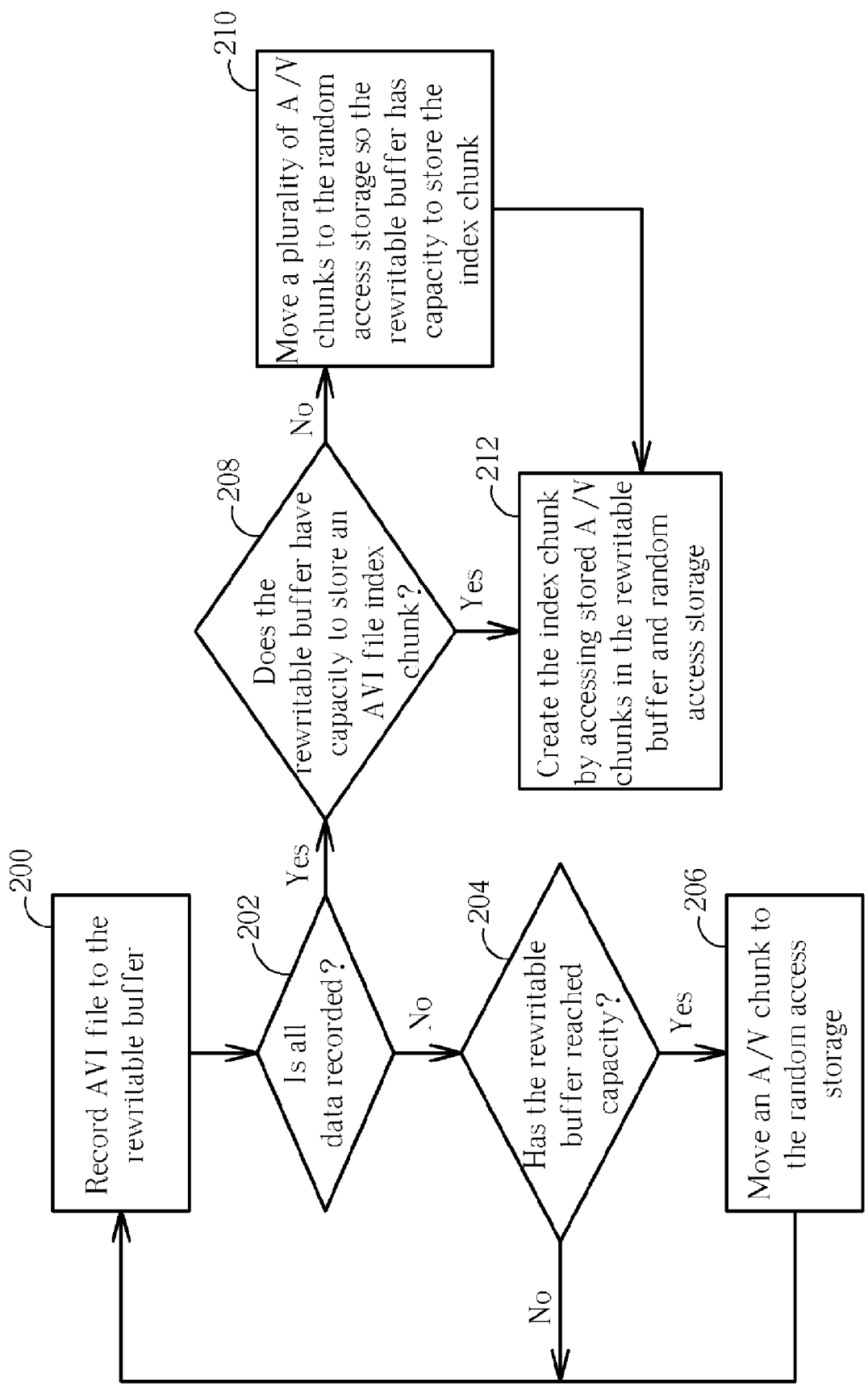
FIG. 2 is a flowchart of a method according to a second embodiment of the present invention.

For a clearer description of the above-described method please refer to an embodiment shown in FIG. 2. FIG. 2 is a flowchart of the method according to a second embodiment of the present invention. The steps are as follows:

Step 200: Record an AVI chunk size to the buffer;
Step 202: Is recording completed? If yes go to Step 208; if no go to Step 204;
Step 204: Has the buffer reached capacity? If yes go to Step 206; if no return to Step 200;
Step 206: Move one or more A/V chunk size from the buffer to the random access storage. Return to Step 200;
Step 208: Examine if there is any A/V chunk size in the random access storage? If yes go to Step 210; if no go to Step 212;
Step 210: Move the A/V chunk sizes stored in the random access storage to the buffer; go to Step 212;
Step 212: Create an AVI index chunk by accessing stored A/V chunk sizes in the buffer.

Initially, recording begins (Step 200). If all data is recorded (Step 202), it is determined by the system whether there are data in the random access storage (Step 208). If all the A/V chunk sizes are stored in the buffer, the system will directly create the index chunk by accessing the stored A/V chunk sizes in the buffer (Step 212). If there is any A/V chunk size moved to the random access storage, the system will read the A/V chunk sizes from the random access storage to the buffer (Step 210). Then, the system will access the A/V chunk sizes in the buffer to create the index chunk (Step 212) for the AVI file.

If the buffer reaches its preset capacity before the recording is finished (Step 204), the system will initially move a first A/V chunk size or a plurality of chunk sizes to the random access storage (Step 206), then continue recording A/V chunk sizes to the buffer (Step 200). Each time the buffer reaches capacity, the system will continue to repeat the above procedure. When recording has finished, the system will (as above) determine if there is any A/V chunk size stored in the random access storage (Step 208). If yes, the system must access the A/V chunk sizes stored in the random access storage and move to the buffer for creating the index chunk (Steps 210 and 212). If all the required A/V chunk sizes are already in the buffer, the system may create AVI index chunk utilizing the data stored in the buffer (Step 212).

The second storage may be a ring memory buffer, and in an embodiment, the ring buffer saves the A/V chunk sizes for the most recent 10 minute A/V chunks. The A/V chunk sizes corresponding to earlier A/V chunks will be moved to the first storage.

The first embodiment of the present invention utilizes a padding operation to reduce the amount of memory space required for storing the A/V chunk sizes. The second embodiment of the present invention reduces the storage size of the buffer (e.g. DRAM) required for storing the A/V chunk sizes by moving some chunk sizes to another storage device (e.g. an available HDD or CF card) periodically. Both methods ensure that a storage device for storing data during recording has sufficient space reserved for creating the index chunk of the AVI file.

Those skilled in the art will readily observe that numerous modifications and alterations of the device and method may be made while retaining the teachings of the invention.

What is claimed is:

1. A method for reserving index memory space of a buffer of a tangible storage device during recording, a file comprising audio data and a plurality of video chunks, the method comprising:

adding one or more padding bytes to the plurality of video chunks to form byte aligned video chunks, wherein
when the plurality of video chunks are aligned by a first byte alignment, a chunk size for indexing the plurality of video chunks is represented by a first number of bits, and
when the plurality of video chunks are aligned by a second byte alignment having a higher order size than the first byte alignment, the chunk size for indexing the plurality of video chunks is represented by a second number of bits which is less than the first number of bits;
interleaving the audio data to the byte aligned video chunks with specific time intervals respectively corresponding to a plurality of video frames; and
storing chunk sizes of the byte aligned video chunks into the buffer.

2. The method of claim 1, wherein the byte alignment is $2^n$ byte alignment.

* * * * *